US007006816B2

(12) United States Patent
Remy

(10) Patent No.: US 7,006,816 B2
(45) Date of Patent: Feb. 28, 2006

(54) SYSTEM AND A METHOD FOR LOCATING A MOBILE TERMINAL, IN PARTICULAR FOR RESCUING IN DISTRESS, AND A DEVICE FOR ALERTING A CORRESPONDING MOBILE TERMINAL

(75) Inventor: Jean-Gabriel Remy, Le Perreux (FR)

(73) Assignee: Societe Francaise du Radiotelephone, Paris La Defense (FR)

( * ) Notice: Subject to any disclaimer, the term of this patent is extended or adjusted under 35 U.S.C. 154(b) by 97 days.

(21) Appl. No.: 10/413,460

(22) Filed: Apr. 11, 2003

(65) Prior Publication Data

US 2004/0033796 A1 Feb. 19, 2004

(30) Foreign Application Priority Data

Apr. 15, 2002 (FR) .................................. 02 04703

(51) Int. Cl.
*H04M 11/04* (2006.01)

(52) U.S. Cl. .............................. 455/404.2; 455/414.2; 455/414.3; 455/431; 455/450; 455/456.3; 455/457; 455/461; 455/421; 455/404.1; 455/521

(58) Field of Classification Search ............ 455/404.2, 455/431, 450, 456, 456.3, 452, 461, 414.2, 455/414.3; 343/895
See application file for complete search history.

(56) References Cited

U.S. PATENT DOCUMENTS 5,353,040 A * 10/1994 Yamada et al. ............. 343/895
6,643,515 B1 * 11/2003 Macridis et al. ............ 455/450
6,675,013 B1 * 1/2004 Gross et al. ................ 455/431
2002/0183074 A1 * 12/2002 Delaveau et al. ........... 455/456

FOREIGN PATENT DOCUMENTS

DE 197 26 357 A1 7/1998
FR 2 768 282 6/1997
WO WO 00/69202 11/2000

* cited by examiner

*Primary Examiner*—Joseph Feild
*Assistant Examiner*—David Q. Nguyen
(74) *Attorney, Agent, or Firm*—Steven M. Koehler; Westman,Champlin & Kelly, P.A.

(57) ABSTRACT

A system for locating a mobile terminal, in particular for rescuing a person in distress equipped with the said mobile terminal. The mobile terminal is of a type able to communicate via the base stations of at least one radio-communication system. The system comprises: at least a device for alerting the mobile terminal, transported by an aircraft and comprising a repeater connected to the first and second antennae, the said first antenna enabling the repeater to communicate with one of the base stations, the said second antenna enabling the repeater to create a specific, limited radio-communication coverage zone, located close to the aircraft, and to communicate with the mobile terminal, if the latter is located in the coverage zone, in such a way as to alert the mobile terminal and to force it to transmit at least a first message; means for locating the mobile terminal based on the said first message transmitted by the mobile terminal.

13 Claims, 1 Drawing Sheet

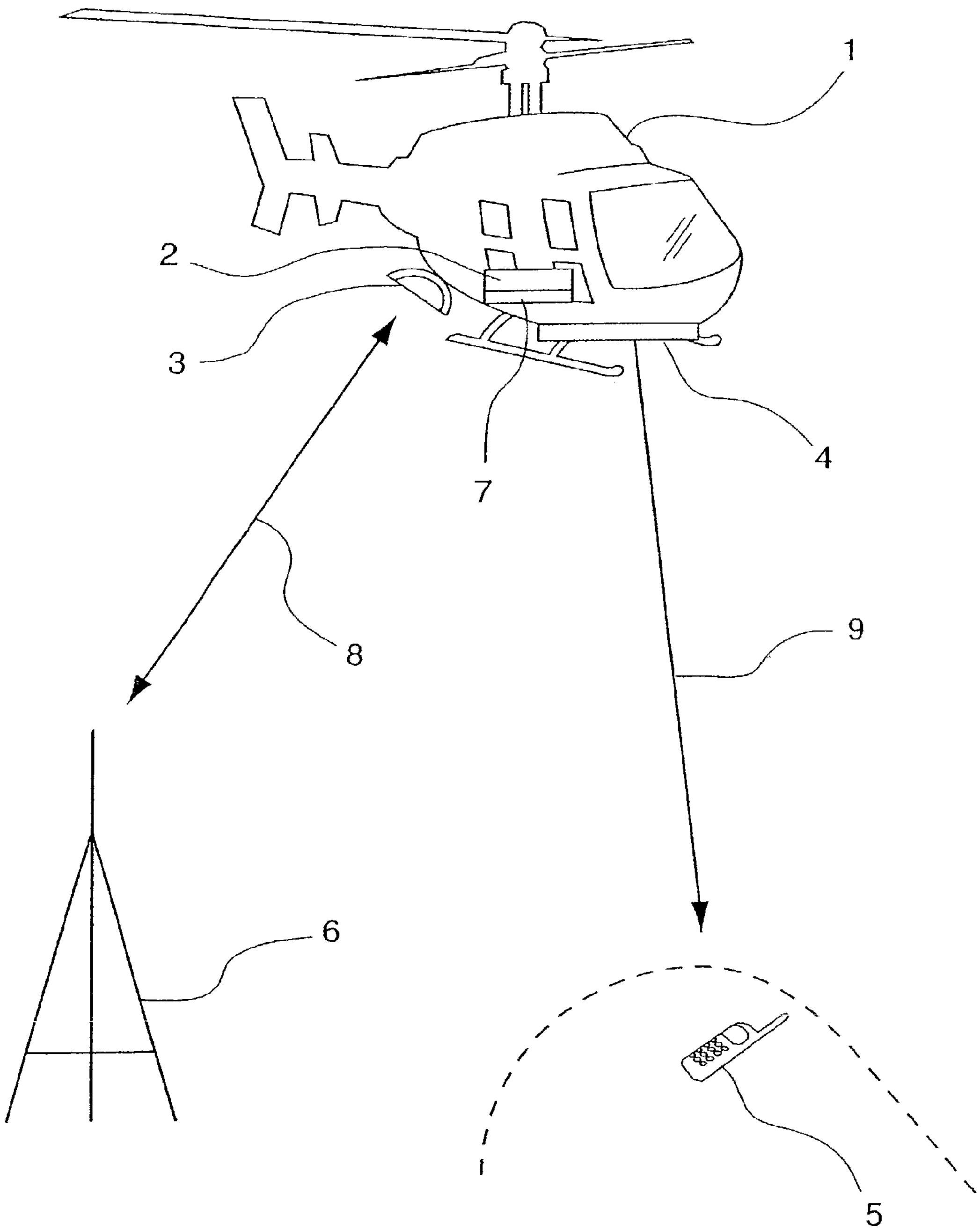
1
2
3
7
4
8
9
6
5

SYSTEM AND A METHOD FOR LOCATING A MOBILE TERMINAL, IN PARTICULAR FOR RESCUING IN DISTRESS, AND A DEVICE FOR ALERTING A CORRESPONDING MOBILE TERMINAL

FIELD OF THE INVENTION

The field of the invention is that of systems for locating people.

The invention applies in particular, but not exclusively, to the location of people in distress, with a view to rescuing them in an emergency situation.

More precisely, the invention relates to a system for locating a mobile terminal, in particular for rescuing a person in distress equipped with the said mobile terminal.

BACKGROUND OF THE INVENTION

There are numerous situations in which it is necessary to precisely locate such people. In particular, in order to increase the safety of people in hazardous areas, there is a clearly expressed need for a system enabling rescue teams to provide rapid assistance to people in distress, such as:

- people trapped beneath snow following an avalanche;
- people who are unconscious following an accident in the mountains, for example a fall into a ravine, a crevasse, etc.;
- survivors of a plane crash in an uninhabited area;
- pleasure craft sailing close to coasts;
- etc.

Until now, the solutions used are based on radio transmitter/receiver type detection systems, which are manual systems, with a short range and used by a large number of people on the ground. Typically, a search and rescue team deployed to explore an avalanche zone comprises between twenty and fifty people using, in addition to the aforementioned manual systems, two or three metre long poles.

For example, for mountain rescue, the recognised systems are the "ARVAR 9000 Avalanche Beacon" (trademark) and the "RECCO" (trademark).

These recognised systems and methods have major drawbacks.

Firstly, because they have a short range, they do not provide an overall view of a search area.

Equally, because of their short range (60 metres in theory), they cannot be effectively used on board helicopters.

Moreover, they require a relatively large investment by those people who wish to protect themselves (for example, people in the mountains who could be caught in an avalanche).

Furthermore, such an investment only enables the person to be located by the given system, among a wide range of systems that are incompatible. It therefore appears difficult to require a person to invest in different equipment for various location systems.

The wide range of recognised location systems, and their incompatibility with each other, also poses a problem for the organisations that are responsible (for example, in France local councils in ski areas), being forced to choose a location system with the full knowledge that a low percentage of the population at risk is likely to benefit from it.

The invention has, in particular, the objective of abolishing or significantly reducing the various drawbacks of the current technology.

More precisely, one of the objectives of this invention is to provide a system for locating people that covers a much larger population than the current systems.

The invention also aims to provide a system that can locate simply, whatever the terrain in which the person to be located may be found.

Another objective of the invention is to provide a system that, in most cases, does not require any investment by the people who wish to protect themselves.

An additional objective of the invention is to provide a system that enables the number of people in a search and rescue team to be reduced.

SUMMARY OF THE INVENTION

These different objectives, as well as others that will subsequently appear, are achieved according to the invention by using a system for locating a mobile terminal, in particular for rescuing a person in distress equipped with the said mobile terminal, the mobile terminal being of a type able to communicate via base stations of at least one radio-communication system. The said location system comprises:

- at least a device for alerting the mobile terminal, transported by an aircraft and comprising a repeater connected to the first and second antennae, the said first antenna enabling the repeater to communicate with one of the base stations, the said second antenna enabling the repeater to create a specific, limited radio-communication coverage zone, located close to the aircraft, and to communicate with the mobile terminal, if the latter is located in the coverage zone, in such a way as to alert the mobile terminal and to force it to transmit at least a first message;
- means for locating the mobile terminal based on, at the least, a first message transmitted by the mobile terminal.

The general principle of the invention is therefore based on a combination of the following characteristics:

- to locate a person, it is necessary to locate a mobile terminal that the person is carrying;
- a device for alerting the mobile terminal is taken onto an aircraft (preferably a helicopter), this device comprising a repeater working with the first and second antennae;
- the mobile terminal is located using a message or messages (typically an access message) that it transmits after having been alerted.

This invention therefore benefits from the fact that mobile terminals (mainly mobile phones) are now widespread. According to recent official sources, 450 million mobile phones are widely used around the world, and in France 40% of the population already has one.

In particular, the latest evaluation carried out by the Peloton des Guides de haute Montagne (PGHM) [Mountain Rescue Service] in Chamonix showed that 50% of the calls that it receives are made by mobile phones able to be located by the radio-communication network (GSM). In the French, Swiss and Italian Alps, approximately 90% of people carry a mobile phone, for safety and for personal use. The small size and low weight of this communication device means that it can be used during leisure activities in mountains that are covered by the network.

In this manner, the use of a mobile phone in a rescue context guarantees maximum coverage of the population in the area (for example in the mountains).

Moreover, by taking the alerting device onto an aircraft (preferably a helicopter), people in distress can be rapidly located.

The repeater easily and effectively allows the coverage zone for base stations to be enlarged, by creating a specific and limited coverage zone, located close to the aircraft. The use of a repeater offers a real advantage because the latter is easy to set up and to configure. Furthermore, a repeater is compact and cheap, in particular when compared to a base station simulator. Its low power consumption enables it to be used on board a helicopter.

The system set forth by this invention also enables the use of search teams to be limited, as well to reduce the number of people in such teams, who are charged with the final location and release of people (trapped under the snow, for example).

The said aircraft should preferably be a helicopter.

Helicopters offer numerous advantages (speed, manoeuvrability, access to practically any location, etc.). It is nevertheless clear that this invention can be used with other types of aircraft.

The said mobile terminal should preferably belong to the group comprising mobile phones, personal digital assistants, etc. This list is not exhaustive.

For the best performance the said first antenna should be a helical antenna or equivalent.

For the best performance the second antenna should be a highly directional antenna, whose degree of directivity should be between 6° and 8°.

An advantageous characteristic is that the said repeater is fitted with an anti-larsen device.

The principle of an anti-larsen device shall be briefly explained. This repeater receives a remote, low energy level transmission on a first antenna (A), amplifies it, and retransmits it unchanged via a second antenna (B). If the first and second antennae (A and B) are not well insulated from each other, the first antenna (A) will receive the transmission from the second antenna (B) and the system will fall over: nothing more can happen. The anti-larsen device detects that the first antenna (A) is receiving the transmission from the second antenna (B) and a special circuit "deletes" the transmission from the second antenna (B) received by the first antenna (A).

In an advantageous version, the said repeater is a repeater with frequency translation.

The principle of a repeater with frequency translation will be briefly explained. To prevent a "fatal" crash by the repeater, the repeater with frequency translation receives a transmission on a first frequency $F_A$ via a first antenna (A) and changes the frequency to retransmit it from a second antenna (B) on a second frequency $F_B$, which is different from the first frequency $F_A$. As a consequence there is no need for a larsen device.

In an initial specific embodiment of the invention, the said means for locating the mobile terminal is of a type using a technique based on the directivity of the said second antenna.

In a second specific embodiment of the invention, the said means for locating the mobile terminal is of a type using a technique based on goniometry.

These initial and second specific embodiments of the invention can be combined.

Most preferably, the system set forth in this invention also comprises:

- means for analysing at least one radio-communication interface, in such a way as to retrieve at least the said first message transmitted by the mobile terminal;
- means for processing at least a first message transmitted by the mobile terminal and retrieved by the means for analysing the interface, in such a way as to recover an ID for the mobile terminal;
- means for sending at least a second message to the mobile terminal whose ID has been recovered, to force it to transmit at least a third message acknowledging receipt and/or answering;
- in such a way that the said location means can locate the mobile terminal from the said first message and from the said third message transmitted by the mobile terminal.

In this way, the mobile terminal is forced to transmit several messages, which makes it easier to locate, in particular by applying a goniometry technique to the messages received, coming from the mobile terminal.

Preferably, the said radio-communication interface should belong to the group comprising:

- the (Um) interface between the repeater and the mobile terminal;
- the interfaces (A–b) between the base stations (BTS) and the base station controllers (BSC) to which the base stations are connected.

In an advantageous version of the system set forth by the invention, in the said device for alerting the mobile terminal, the repeater is replaced by a "mini radio-communication network".

The invention also relates to a device for alerting a mobile terminal with a view to locating it, in particular for rescuing a person in distress equipped with the said mobile terminal, the mobile terminal being of a type able to communicate via base stations of at least one radio-communication system. The said device for alerting the mobile terminal is designed to be transported by an aircraft and comprises a repeater connected to a first and second antenna, the said first antenna enabling the repeater to communicate with one of the base stations, the said second antenna enabling the repeater to create a specific, limited radio-communication coverage zone located close to the aircraft, and to communicate with the mobile terminal if it is located in the coverage zone, in such a way as to alert the mobile terminal and to force it to transmit at least a first message, in such a way that the location equipment can locate the said mobile terminal on the basis of the said first message transmitted by the mobile terminal.

The invention also relates to a method for locating a mobile terminal, in particular for rescuing a person in distress equipped with the said mobile terminal, the mobile terminal being of a type able to communicate via base stations of at least one radio-communication system. The said method comprising the following steps:

- an aircraft transporting at least a device for alerting a mobile terminal is flown over a search area, the said alerting device comprising a repeater connected to a first and second antenna, the said first antenna enabling the repeater to communicate with one of the base stations, the said second antenna enabling the repeater to create a specific, limited radio-communication coverage zone located close to the aircraft;
- the said alerting device transmits a pre-determined signal, in such a way as to alert the mobile terminal if it is located in the coverage zone, forcing it to transmit at least a first message;
- the mobile terminal is located using the said first message that it has transmitted.

BRIEF DESCRIPTION OF THE DRAWING

Other characteristics and advantages of the invention will become apparent on reading the following description, according to a preferred embodiment of the invention, given as a purely indicative and non-limitative example, and the appended drawings, in which:

the single FIGURE shows a specific embodiment of a system for locating a mobile terminal set forth in the invention.

DETAILED DESCRIPTION OF THE PREFERRED EMBODIMENTS

The invention therefore relates to a system and method for locating a mobile terminal, in particular for rescuing a person in distress equipped with this mobile terminal.

In a conventional fashion, the mobile terminal is of a type able to communicate via the base stations (BTS) of a radio-communication system.

The invention applies to all types of radio-communication systems, in particular, but not exclusively, using the GSM (Global System for Mobile Communications), DCS 1800 (Digital Cellular System 1800 MHz), PCS 1900 (Personal Communication System), DECT (Digital European Cordless Telecommunications), UMTS (Universal Mobile Telecommunications) standards etc.

Throughout the description, it is presumed that the mobile terminal is a mobile phone 5. It is nevertheless clear that the invention is not limited to this specific type of mobile terminal.

In the embodiment illustrated in the single FIGURE, the location system set forth in the invention comprises:

a device for alerting a mobile phone, transported by a helicopter 1 and comprising a repeater 2 connected to the first and second antenna 3 & 4;

equipment 7 for locating a mobile phone from one or more messages transmitted by the mobile phone.

The first antenna 3 enables the repeater 2 to communicate (as illustrated by the arrow marked 8) with one of the base stations (BTS) 6. The first antenna 3 (or BTS-repeater antenna) should preferably be a helical or equivalent antenna.

The second antenna 4 enables the repeater 2 to create a specific, limited radio-communication coverage zone located close to the helicopter, and to communicate (as illustrated by the arrow marked 9) with the mobile phone if it is located in the coverage zone. In this way, the repeater 2 will alert the mobile phone (in particular by transmitting a BCCH carrier in the case of a GSM system) and force it to transmit at least a first message (an access request transmitted on the RACH channel in the case of a GSM system).

The second antenna 4 (or repeater-mobile phone antenna) should preferably be a highly directional antenna, for example a vertical panel antenna mounted horizontally.

In other words, the repeater 2 performs the following functions:

thanks to the second antenna 4, it repeats, with or without frequency translation, signals (in particular the BCCH carrier in the case of a GSM system) coming from a base station, which it has received thanks to the first antenna 3. It is in this way that the repeater 2 creates a specific, limited radio-communication zone located close to the helicopter 1;

thanks to the first antenna 3, it repeats to the aforementioned base station, with or without frequency translation, signals (in particular access requests received on the RACH channel in the case of a GSM system) coming from a mobile phone and which it has received thanks to the second antenna 4.

Preferably, a repeater with an anti-larsen device should be used (for example the "MIKOM" model (trademark)) or a repeater with frequency translation.

It should be noted that the repeater 2 can be carried by a helicopter, because the helicopter 1 is limited to 400 W of power and a repeater consumes on average 100 W for a gain of 10 W.

For example, a broadband repeater (ETSA) with the following characteristics should be used:

average gain and power output;

low cost;

a gain of 40–60 dB;

power of 10 mW;

noise of approximately 8 dB;

weight of approximately 10 kg.

In the case of a radio-communication system using the GSM and DCS 1800 standards, a broad band 900 MHz and 1800 MHz repeater can be used to process all of the GSM and DCS bands.

The repeater can also be set to one particular channel, with or without frequency translation.

The equipment 7 for locating a mobile phone can be of a type using a technique based on the directivity of the second antenna 4 and/or a technique based on goniometry.

A first technique based on the directivity of the second antenna 4 shall now be presented. To focus the RF energy on the useful zones, the operators have developed highly directional antennae on a vertical plane, with between 6° and 8° of opening at 3 dB. These antennae are relatively bulky "panels" (2.5 metres long for 900 MHz and 1.3 metres long for 1800 MHz). The technique proposed for this invention consists of using these antennae by mounting them horizontally and not vertically, in this case the RF energy is concentrated on a very restricted sector, tracing a narrow line on the ground. By passing over the area twice, it is easy to cross these lines and to locate the search area with a high degree of precision.

In a second embodiment, based on goniometry, the antennae are arranged in a ring (for example, eight antennae positioned equidistantly and therefore spread around the circumference of a circle). A special receiver captures the energy received by each of the antennae with the time of reception of each binary element. The displacement measured in this way reveals the direction of the transmission that has been received. As with the first technique outlined above, at least two over-flights are needed to pinpoint the precise search area.

A version of the location system set forth by the invention is presented, in which the system also comprises:

equipment for analysing at least one radio-communication interface, in such a way as to capture the first message mentioned above (an access request transmitted on the RACH channel in the case of a GSM system) transmitted by the mobile phone;

equipment for processing this first message transmitted by the mobile phone and captured by the interface analysis tools, in such a way as to recover a mobile phone ID (for example, its IMSI number);

equipment for sending one or more second messages preferably in a burst (for example, short "SMS" messages in the case of a GSM system) to the mobile phone whose ID has been recovered, to force it to transmit one or more third messages acknowledging receipt and/or answering ("Acknowledge Message" in GSM terminology).

So, in this version, the location equipment 7 described above can locate the mobile phone not only by using the first message but also by using the third messages transmitted by the mobile phone.

The aforementioned analysis equipment may comprise one or more protocol analysers, used to analyse the Um interface, between the repeater 2 and the mobile terminal 5, and/or the A–b interfaces, between the base stations (BTS) 6 and the base station controllers (BSC) to which they are connected.

Operation of this version of the location system set forth by the invention can be summarised as follows:

- the alerting device in the helicopter alerts the mobile phone 5, by transmitting strongly over a limited area (second highly directional antenna 4). In a general manner, the system set forth by the invention therefore enables specific, limited coverage to be created close to the helicopter, over the site of the accident. The following two cases can be distinguished: either there is no GSM coverage (or other type of coverage) at the site of the accident and in this case it is created, or there is already GSM coverage (or other type of coverage) and in this case the mobile phone is forced to relocate by frequency translation;
- the mobile phone 5 attempts to register by issuing an access request (first message) via the RACH channel;
- an ID is recovered from the mobile phone by capture (on the A–b or Um interface) and the access request is processed. This step can be implemented by one or more operators, who are asked to identify the base station(s) covering the site of the accident (for example a mountain area) and to observe the interfaces (for example A–b) by using protocol analysers (samplers);
- bursts of short messages (SMS) are sent (second messages) to force the mobile phone to transmit messages acknowledging receipt (third messages). These short messages can be initiated by any recognised equipment (via the internet, modified mobile phones, the GPRS service, etc.);
- the phone is located (using a technique based on the directivity of the second antenna and/or on goniometry) after the mobile phone has sent several (first and third) messages.

In another version of the location system set forth by the invention, the repeater 2 is replaced by a "mini radio-communication network", for example using the "INTERWAVE" model (trademark).

It should be noted that a "mini radio-communication network" is a device that integrates, within a restricted range of functions, the various components of a radio-communication infrastructure. For example, in the case of GSM, it integrates the functions of the following components:

- HLR ("Home Location Register", nominal location recording),
- VLR ("Visitor Location Register", visitor location recording),
- MSC ("Mobile Services Switching Center", mobile service switching),
- BSC ("Base Station Controller", base station controlling)
- BTS ("Base Transceiver Station", base station), In this manner, the "rack" for the mini network is a PLMN in itself. It can operate with mobiles that are "roaming" and in particular with their attempts to register, which will be used for location.

Although the present invention has been described with reference to preferred embodiments, workers skilled in the art will recognize that changes may be made in form and detail without departing from the spirit and scope of the invention.

What is claimed is:

1. A system for locating a mobile terminal, in particular for rescuing a person in distress equipped with the said mobile terminal, the mobile terminal being of a type able to communicate via base stations of at least one radio-communication system, the said location system comprising:

- at least a device for alerting the mobile terminal, transported by an aircraft and comprising a repeater connected to the first and second antennae, the said first antenna enabling the repeater to communicate with one of the base stations, the said second antenna enabling the repeater to create a specific, limited radio-communication coverage zone, located close to the aircraft, and to communicate with the mobile terminal, if the latter is located in the coverage zone, in such a way as to alert the mobile terminal and to force it to transmit at least a first message;
- means for analysing at least one radio-communication interface, in such a way as to retrieve the said first message transmitted by the mobile terminal;
- means for processing the said first message transmitted by the mobile terminal and retrieved by the means for analysing the interface, in such a way as to recover an ID of the mobile terminal;
- means for sending at least a second message to the mobile terminal whose ID has been recovered, to force it to transmit at least a third message acknowledging receipt and/or answering; and
- location means for locating the mobile terminal based on the said at least one first message transmitted by the mobile terminal in such a way that the said location means can locate the mobile terminal from the said first message and from the said third message transmitted by the mobile terminal.

2. A system according to claim 1, where the said aircraft is a helicopter.

3. A system according to claim 1, where the said mobile terminal belongs to a group comprising:

- mobile phones; and
- personal digital assistants.

4. A system according to claim 1, where the said first antenna is a helical antenna.

5. A system according to claim 1, where the said second antenna is a highly directional antenna, whose degree of directivity is between 6° and 8°.

6. A system according to claim 1, where the said repeater is a repeater fitted with an anti-larsen device.

7. A system according to claim 1, where the said repeater is a repeater with frequency translation.

8. A system according to claim 1, where the said means for locating the mobile terminal is of a type using a technique based on the directivity of the said second antenna.

9. A system according to claim 1, where the said location means for locating the mobile terminal is of a type using a technique based on goniometry.

10. A system according to claim 1, where at least one said radio communication interface belongs to the group comprising:

- the interface between the repeater and the mobile terminal; and the interfaces between the base stations and the base station controllers to which the base stations are connected.

11. A system according to claim 1, where in the said device for alerting the mobile terminal, the repeater is replaced by a "mini radio-communication network".

12. A device for alerting a mobile terminal with a view to locating it, in particular for rescuing a person in distress equipped with the said mobile terminal, the mobile terminal being of a type able to communicate via base stations of at least one radio-communication system, where the said device for alerting the mobile terminal is designed to be transported by an aircraft and comprises a repeater connected to a first and second antenna, the said first antenna enabling the repeater to communicate with one of the base stations, the said second antenna enabling the repeater to create a specific, limited radio-communication coverage zone located close to the aircraft, and to communicate with the mobile terminal if it is located in the coverage zone, in such a way as to alert the mobile terminal and to force it to transmit at least a first message, the device further comprising:

means for analysing at least one radio-communication interface, in such a way as to retrieve the said first message transmitted by the mobile terminal, means for processing the said first message transmitted by the mobile terminal and retrieved by the means for analysing the interface, in such a way as to recover an ID of the mobile terminal, means for sending at least a second message to the mobile terminal whose ID has been recovered, to force it to transmit at least a third message acknowledging receipt and/or answering, and location means for locating the mobile terminal based on the said at least one first message transmitted by the mobile terminal in such a way that the said location means can locate the mobile terminal from the said first message and from the said third message transmitted by the mobile terminal.

13. A method for locating a mobile terminal, in particular for rescuing a person in distress equipped with the said mobile terminal, the mobile terminal being of a type able to communicate via base stations of at least one radio-communication system, the said method comprising:

transporting at least a device for alerting a mobile terminal via an aircraft flown over the search area for the mobile terminal, the said alerting device comprising a repeater connected to a first and second antenna, the said first antenna enabling the repeater to communicate with one of the base stations, the said second antenna enabling the repeater to create a specific, limited radio communication coverage zone located close to the aircraft;

transmitting a pre determined signal, in such a way as to alert the mobile terminal if it is located in the coverage zone, forcing it transmit at least a first message;

analysing at least one radio-communication interface, in such a way as to retrieve the said first message transmitted by the mobile terminal;

processing the said first message transmitted by the mobile terminal and retrieved by the means for analysing the interface, in such a way as to recover an ID of the mobile terminal;

sending at least a second message to the mobile terminal whose ID has been recovered, to force it to transmit at least a third message acknowledging receipt and/or answering; and locating the mobile terminal based on the said at least one first message transmitted by the mobile terminal in such a way that the said location means can locate the mobile terminal from the said first message and from the said third message transmitted by the mobile terminal.

* * * * *